United States Patent
Zhang et al.

(10) Patent No.: US 11,690,060 B2
(45) Date of Patent: *Jun. 27, 2023

(54) SYSTEM AND METHOD FOR BANDWIDTH UTILIZATION

(71) Applicants: Liqing Zhang, Ottawa (CA); Jianglei Ma, Ottawa (CA); Kelvin Kar Kin Au, Kanata (CA); Wen Tong, Ottawa (CA)

(72) Inventors: Liqing Zhang, Ottawa (CA); Jianglei Ma, Ottawa (CA); Kelvin Kar Kin Au, Kanata (CA); Wen Tong, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 65 days.

This patent is subject to a terminal disclaimer.

(21) Appl. No.: 17/182,347

(22) Filed: Feb. 23, 2021

(65) Prior Publication Data

US 2021/0185698 A1    Jun. 17, 2021

Related U.S. Application Data

(63) Continuation of application No. 15/454,758, filed on Mar. 9, 2017, now Pat. No. 10,945,274.

(Continued)

(51) Int. Cl.
*H04W 72/044*    (2023.01)
*H04W 72/12*    (2023.01)
(Continued)

(52) U.S. Cl.
CPC ........... *H04W 72/12* (2013.01); *H04L 5/0044* (2013.01); *H04L 5/0092* (2013.01);
(Continued)

(58) Field of Classification Search
None
See application file for complete search history.

(56) References Cited

U.S. PATENT DOCUMENTS 6,731,615 B1    5/2004    Bousquet et al.
10,945,274 B2 *    3/2021    Zhang ................ H04W 72/044
(Continued)

FOREIGN PATENT DOCUMENTS

CN    1941762 A    4/2007
CN    101272615 A    9/2008
(Continued)

OTHER PUBLICATIONS

Orange: "Flexibly Configured OFDM (FC-OFDM) waveform", 3GPP Draft; R1-164619, vol. RAN WG1, , No. Nanjing, China; May 11, 2016, XP051096934, 14 pages.
(Continued)

*Primary Examiner* — The Hy Nguyen (57) ABSTRACT

Methods of bandwidth utilization are provided. Within a scheduling bandwidth, which may be an entire carrier bandwidth or a sub-band, scheduling is used to reserve a guard zone at the edge of the scheduled bandwidth. This can be based on the frequency localization capabilities of a transmitter that is to be scheduled. The guard zone may be defined to a resolution that is the same as the scheduling resolution in which case the guard zone is defined entirely through scheduling. Alternatively, the guard zone may be defined to a resolution smaller than the scheduling resolution in which case scheduling and further signaling may be employed to define the guard zone.

25 Claims, 8 Drawing Sheets

Related U.S. Application Data (60) Provisional application No. 62/336,232, filed on May 13, 2016.

(51) Int. Cl.
 *H04L 5/00* (2006.01)
 *H04L 27/26* (2006.01)

(52) U.S. Cl.
 CPC ..... *H04L 27/26025* (2021.01); *H04W 72/044* (2013.01); *H04L 5/0007* (2013.01)

(56) References Cited

U.S. PATENT DOCUMENTS

| | | | |
|---|---|---|---|
| 2005/0180313 A1* | 8/2005 | Kim | H04L 5/006 370/208 |
| 2009/0185632 A1* | 7/2009 | Cai | H04L 5/0044 375/260 |
| 2010/0054233 A1* | 3/2010 | Park | H04L 27/2602 370/350 |
| 2010/0178057 A1* | 7/2010 | Shieh | H04L 27/264 398/79 |
| 2011/0096783 A1 | 4/2011 | Cai et al. | |
| 2011/0317647 A1* | 12/2011 | Cho | H04L 27/2607 370/329 |
| 2013/0070708 A1 | 3/2013 | Bai et al. | |
| 2014/0192848 A1 | 7/2014 | Rao et al. | |
| 2015/0229502 A1* | 8/2015 | Vilaipornsawai | H04L 27/2607 375/295 |
| 2015/0256308 A1 | 9/2015 | Ma et al. | |
| 2015/0365203 A1 | 12/2015 | Suh et al. | |
| 2017/0311292 A1* | 10/2017 | Choi | H04L 1/003 |
| 2018/0198649 A1* | 7/2018 | Lindoff | H04L 5/0087 |

FOREIGN PATENT DOCUMENTS

| | | |
|---|---|---|
| CN | 101772037 A | 7/2010 |
| CN | 101828369 A | 9/2010 |
| CN | 102388591 A | 9/2010 |
| CN | 102244631 A | 11/2011 |
| CN | 105472747 A | 4/2016 |
| EP | 2704348 A1 | 3/2014 |
| JP | 2011504018 A | 1/2011 |
| JP | 2012525019 A | 10/2012 |
| JP | 2016506674 A | 3/2016 |
| JP | 2017525191 A | 8/2017 |
| WO | 2009062115 A2 | 5/2009 |
| WO | 2015096125 A1 | 7/2015 |

OTHER PUBLICATIONS

Intel Corporation:"Considerations on waveform selection for new radio interface", 3GPP Draft; R1-162384, vol. RAN WG1, No. Busan, South Korea; Apr. 2, 2016, XP051080163, 6 pages.

NTT DOCOMO et al: "Initial link level evaluation of waveforms",3GPP Draft; R1-163110, vol. RAN WG1 , No. Busan, Korea; Apr. 2, 2016, XP051080547, 20 pages.

Huawei, HiSilicon, General views on 5G coexistence study [online], 3GPP TSG-RAN WG4 Meeting #78bis R4-162374, Apr. 2016, total 5 pages.

Ericsson, Numerology for NR [online], 3GPP TSG RAN WG1 Meeting #84bis R1-163227, Apr. 1, 2016, total 14 pages.

Huawei, HiSilicon, Further evaluation assumptions for waveform. 3GPP TSG RAN WG1 Meeting #85, Nanjing, China, May 23-27, 2016, R1-164034, 3 pages.

* cited by examiner

SYSTEM AND METHOD FOR BANDWIDTH UTILIZATION

CROSS REFERENCE TO RELATED APPLICATION

This application is a continuation of U.S. patent application Ser. No. 15/454,758 filed Mar. 9, 2017, entitled "System and Method for Bandwidth Utilization". This application claims priority to U.S. Provisional Application No. 62/336,232 filed May 13, 2016, entitled "System and Method for Bandwidth Utilization". The contents of both applications are incorporated by reference herein in their entirety.

FIELD

The application relates to systems and methods for bandwidth utilization.

BACKGROUND

In conventional networks, a carrier bandwidth is associated with a particular carrier frequency. Within an overall system bandwidth, there might be multiple carriers, each having a respective carrier bandwidth. Within each carrier bandwidth, respective guard bands are defined at the low frequency end and at the high frequency end to achieve channel separation between adjacent carriers.

SUMMARY

Methods of bandwidth utilization are provided. Within a scheduling bandwidth, which may be an entire carrier bandwidth or a sub-band, scheduling is used to implement a guard zone at the edge of the scheduled bandwidth. This can be based on the frequency localization capabilities of a transmitter that is to be scheduled. The guard zone may be defined to a resolution that is the same as the scheduling resolution in which case the guard zone is defined entirely through scheduling. Alternatively, the guard zone may be defined to a resolution smaller than the scheduling resolution in which case scheduling and further signaling may be employed to define the guard zone. Advantageously, more efficient bandwidth utilization may be achieved compared to an implementation in which guard zones are permanently reserved adjacent to scheduling bandwidths.

According to one aspect of the present disclosure, there is provided a method comprising: communicating, by an apparatus with a transmission and reception point(TRP), a first signal in a first sub-band of a carrier, wherein the first sub-band has a first subcarrier spacing; the carrier comprises a second sub-band, the second sub-band has a second subcarrier spacing different from the first subcarrier spacing; and the carrier comprises a third sub-band between the first sub-band and the second sub-band; wherein a first scheduling is used for indicating a first width in frequency of a first guard band between the first sub-band and the third sub-band or between the second sub-band and the third sub-band of the carrier.

Optionally, the carrier comprises a second guard band at a first edge of the carrier adjacent to the first sub-band; the carrier comprises a third guard band at a second edge of the carrier adjacent to the second sub-band; and a second scheduling is used to define a width in frequency of the second guard band or third guard band.

Optionally, each of the first scheduling and the second scheduling indicates resource information defined by resource unit of any one of resource block, partial resource block, resource block group or sub-carrier spacing.

Optionally, a second width in frequency of the second guard band is defined by the first subcarrier spacing, a third width in frequency of the third guard band is defined by the second subcarrier spacing, and the second guard band has a different width in frequency than the third guard band.

Optionally, the method further comprises: receiving, by the apparatus, indication of at least one sub-band comprising the first sub-band.

Optionally, the method further comprises: receiving, by the apparatus, indication of resource information within the first sub-band, wherein the resource information is scheduled by resource unit of any one of the following: resource block group; fractional resource block group; resource block; fractional resource block; sub-carrier.

Optionally, each of the first subcarrier spacing and the second subcarrier spacing is 15 kHz, 30 kHz, 60 kHz, or 120 kHz.

Optionally, the first subcarrier spacing has a reference sub-carrier grid to align with a sub-carrier of the second subcarrier spacing.

Optionally, the method further comprises: receiving, by the apparatus from the TRP, a second signal in the second sub-band of the carrier using the second subcarrier spacing.

Optionally, the first signal is transmitted with a waveform type of filtered OFDM or windowed OFDM, and/or the second signal is transmitted with a waveform type of filtered OFDM or windowed OFDM.

According to one aspect of the present invention, there is disclosure an apparatus comprising: at least one processor; and a memory storing processor-executable instructions that, when executed, cause the apparatus to:

communicate, with a transmission and reception point (TRP), a first signal in a first sub-band of a carrier, wherein the first sub-band has a first subcarrier spacing; the carrier comprises a second sub-band, the second sub-band has a second subcarrier spacing different from the first subcarrier spacing; and the carrier comprises a third sub-band between the first sub-band and the second sub-band; wherein a first scheduling is used for indicating a first width in frequency of a first guard band between the first sub-band and the third sub-band or between the second sub-band and the third sub-band of the carrier.

Optionally, the carrier comprises a second guard band at a first edge of the carrier adjacent to the first sub-band; the carrier comprises a third guard band at a second edge of the carrier adjacent to the second sub-band; and a second scheduling is used to define a width in frequency of the second guard band or third guard band.

Optionally, each of the first scheduling and the second scheduling indicates resource information defined by resource unit of any one of resource block, partial resource block, resource block group or sub-carrier spacing.

Optionally, a second width in frequency of the second guard band is defined by the first subcarrier spacing, a third width in frequency of the third guard band is defined by the second subcarrier spacing, and the second guard band has a different width in frequency than the third guard band.

Optionally, the first subcarrier spacing has a reference sub-carrier grid to align with a sub-carrier of the second subcarrier spacing.

According to another aspect of the present disclosure, there is provided a method comprising: communicating, by transmission and reception point (TRP) with an apparatus a first signal in a first sub-band of a carrier, wherein the first sub-band has a first subcarrier spacing; the carrier comprises a second sub-band, the second sub-band has a second subcarrier spacing different from the first subcarrier spacing; and the carrier comprises a third sub-band between the first sub-band and the second sub-band; wherein a first scheduling is used for indicating a first width in frequency of a first guard band between the first sub-band and the third sub-band or between the second sub-band and the third sub-band of the carrier.

Optionally, the carrier comprises a second guard band at a first edge of the carrier adjacent to the first sub-band; the carrier comprises a third guard band at a second edge of the carrier adjacent to the second sub-band; and a second scheduling is used to define a width in frequency of the second guard band or third guard band.

Optionally, each of the first scheduling and the second scheduling indicates resource information defined by resource unit of any one of resource block, partial resource block, resource block group or sub-carrier spacing.

Optionally, a second width in frequency of the second guard band is defined by the first subcarrier spacing, a third width in frequency of the third guard band is defined by the second subcarrier spacing, and the second guard band has a different width in frequency than the third guard band.

Optionally, the first subcarrier spacing has a reference sub-carrier grid to align with a sub-carrier of the second subcarrier spacing.

According to another aspect of the present disclosure, there is provided a transmission and reception point (TRP) comprising: at least one processor; and a memory storing processor-executable instructions that, when executed, cause the TRP to: communicate with an apparatus, a first signal in a first sub-band of a carrier, wherein the first sub-band has a first subcarrier spacing; the carrier comprises a second sub-band, the second sub-band has a second subcarrier spacing different from the first subcarrier spacing; and the carrier comprises a third sub-band between the first sub-band and the second sub-band; wherein a first scheduling is used for indicating a first width in frequency of a first guard band between the first sub-band and the third sub-band or between the second sub-band and the third sub-band of the carrier.

Optionally, the carrier comprises a second guard band at a first edge of the carrier adjacent to the first sub-band; the carrier comprises a third guard band at a second edge of the carrier adjacent to the second sub-band; and a second scheduling is used to define a width in frequency of the second guard band or third guard band.

Optionally, each of the first scheduling and the second scheduling indicates resource information defined by resource unit of any one of resource block, partial resource block, resource block group or sub-carrier spacing.

Optionally, a second width in frequency of the second guard band is defined by the first subcarrier spacing, a third width in frequency of the third guard band is defined by the second subcarrier spacing, and the second guard band has a different width in frequency than the third guard band.

Optionally, the first subcarrier spacing has a reference sub-carrier grid to align with a sub-carrier of the second subcarrier spacing.

BRIEF DESCRIPTION OF THE DRAWINGS

Embodiments of the disclosure will now be described with reference to the attached drawings in which.

DETAILED DESCRIPTION

Generally, embodiments of the present disclosure provide a method and system for bandwidth utilization. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 1:
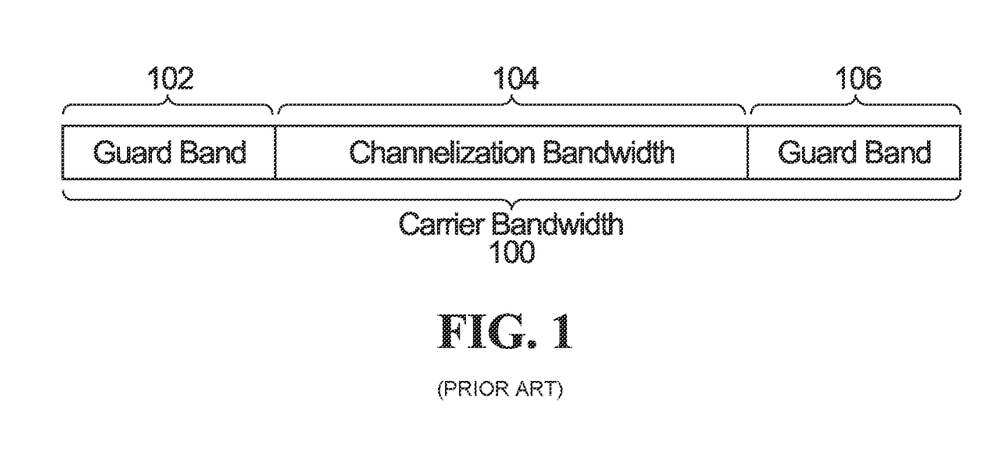
FIG. 1 is an example of conventional bandwidth utilization.

FIG. 1 is a logical diagram showing an example of partial band utilization. Shown is a carrier bandwidth 100. Within that carrier bandwidth 100 is defined a channelization bandwidth 104 within which a channelization framework is defined, excluding guard bands 102 and 106. The channelization framework is defined such that resources can be allocated only within the channelization bandwidth 104.

Figure 2:
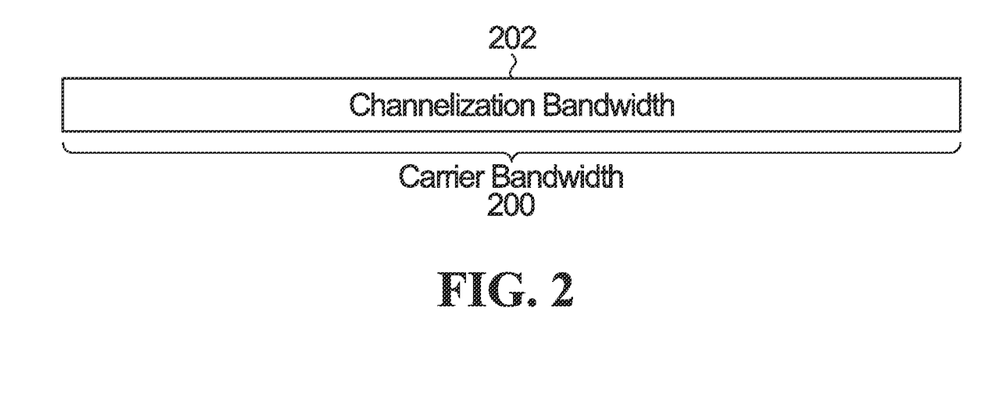
FIG. 2 is an example of bandwidth utilization in accordance with an embodiment of the invention.

In accordance with an embodiment of the invention, for a given carrier, a channelization framework is defined that occupies the entire carrier bandwidth. With this approach, the carrier bandwidth of an adjacent carrier can be immediately adjacent to the carrier bandwidth of the subject carrier. This approach can be applied for all carriers within a multi-carrier system, or only for a subset of the carriers. Filtering or windowing can be performed to localize the spectrum of the transmitted waveform. An example is depicted in FIG. 2. Shown is a carrier bandwidth 200. Channelization is performed using a channelization framework that occupies a channelization bandwidth 202 that occupies the entire carrier bandwidth 200. A signaling scheme allows the allocation of channels across the entire channelization bandwidth. In this case, because the channelization bandwidth 202 occupies the entire carrier bandwidth 200, the signaling scheme also allows the allocation of channels across the entire carrier bandwidth.

Depending on the nature of the signals to be transmitted using the channelization framework thus defined, there may be a need for a guard zone on one or both ends of the carrier bandwidth. However, rather than having fixed guard zones, as in the conventional approach of FIG. 1, in these embodiments, the necessary guard zone or zones are achieved through scheduling. This approach can be applied to uplink transmissions or downlink transmissions or both uplink and downlink transmissions.

In a first example, the carrier bandwidth is divided into a plurality of resource blocks. Each resource block occupies a set of sub-carriers in the frequency domain. On the uplink, scheduling is used to assign specific user equipment (UEs) to transmit on specified resource blocks for uplink transmission. The scheduling mechanism allows any of the resource blocks to be assigned. Depending on a given channel utilization scenario, the scheduler may allocate certain resource blocks or parts of certain resource blocks to function as guard zones, for example by not scheduling any traffic in those resource blocks. This resource block assignment can be done persistently or dynamically, and may involve signaling to the UE that identifies what resource blocks to use. Similarly, on the downlink, scheduling is used to assign specific RBs for use in transmitting to particular UEs. Again, this can be persistent or dynamic.

Figure 3A:
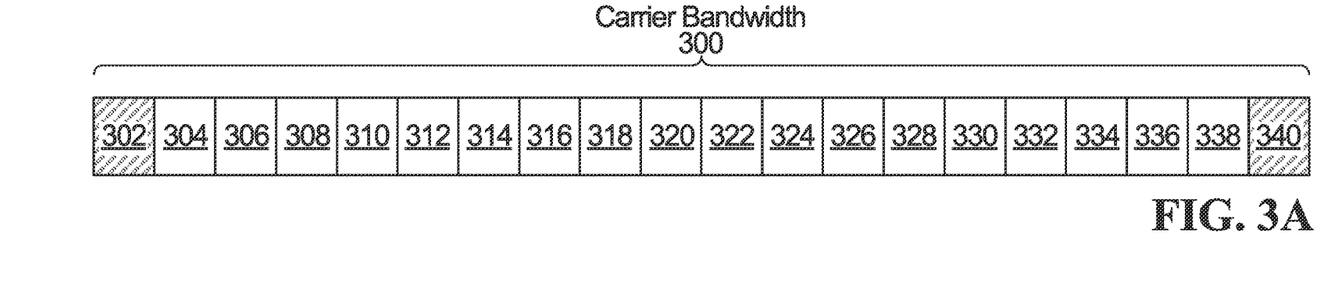
FIG. 3A is an example of bandwidth utilization in accordance with an embodiment of the invention in which entire resource blocks are assigned through scheduling to function as guard zones.

An example of a subchannelization framework is depicted in FIG. 3A. Shown is a carrier bandwidth 300 divided into twenty resource blocks 302, 304, ..., 340. The subchannelization framework occupies the entire subcarrier bandwidth. The scheduling mechanism allows for the assignment of any of the twenty resource blocks 302, 304, ..., 340. Scheduling is used to define guard zones. In the illustrated example, to create guard zones in the frequencies of resource blocks 302, 340, scheduling is performed in a manner that does not assign the resource blocks 302, 340.

In some embodiments, the guard zone is allocated through scheduling in units of resource blocks. In this case, the guard zone on either end occupies an integer number of resource blocks. This is the case for the example of FIG. 3A. If a resource block is 12 subcarriers wide in frequency, then the minimum guard zone width is 12 subcarriers.

Figure 3B:
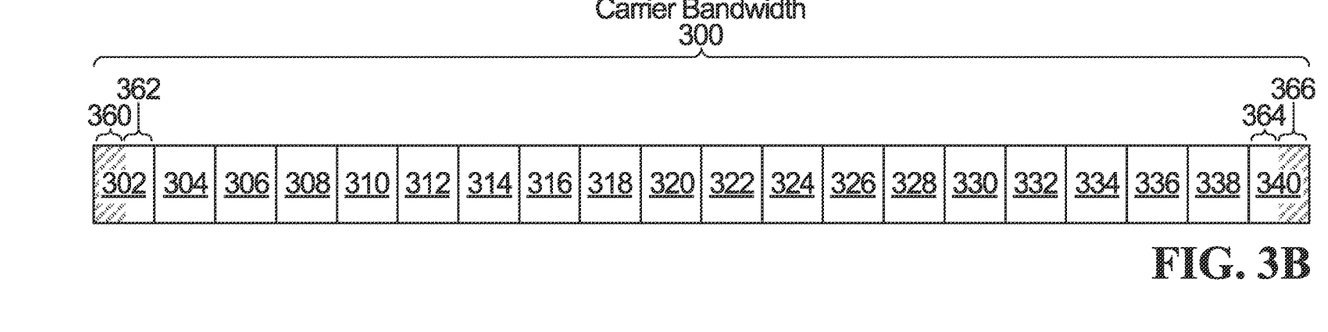
FIG. 3B is an example of bandwidth utilization in accordance with an embodiment of the invention in which fractional resource blocks are assigned through scheduling to function as guard zones.

In another embodiment, the guard zone is allocated at a finer resolution, for example fractions of a resource blocks. For example, if the guard zone is allocated in units that are half a resource block in size, and a resource block is 12 subcarriers wide, then the minimum guard zone width is 6 subcarriers. Where part of a resource block is assigned to a guard band, if that resource block is also assigned for traffic, both transmitter and receiver need to be aware to use only the remaining portion of the resource block for data. A mechanism for this is described below. An example is depicted in FIG. 3B, where guard zones are defined that occupy half of each of resource blocks 302 and 340. In resource block 302, portion 360 functions as a guard zone, and portion 362 is available to contain data. Similarly, in resource block 340, portion 366 functions as a guard zone, and portion 364 is available to contain scheduled content.

In some embodiments, the guard zone is allocated down to the resolution of individual subcarriers. Again, where part of a resource block is assigned to a guard band, if that resource block is also assigned for traffic, both transmitter and receiver need to be aware to use only the remaining portion of the resource block for data.

Figure 3C:
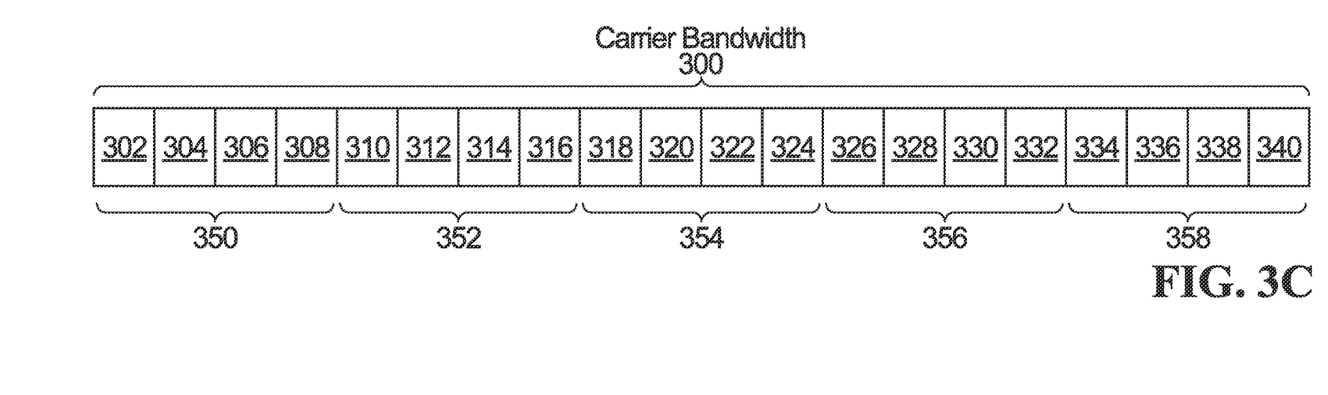
FIG. 3C is an example of bandwidth utilization in accordance with an embodiment of the invention in which scheduling is based on resource block groups, and guard zones are assigned to a resolution of resource block group, fractional resource block group, resource block, fractional resource block or sub-carrier.

In some embodiments, the channelization framework includes grouping the resource blocks into resource block groups (RBGs), with a resource block group being a minimum unit of allocation. For example, referring now to FIG. 3C, the 20 resource blocks of FIG. 3A may be grouped into RBG 350, 352, 354, 356, 358 each having 4 resource blocks. In this embodiment, guard zones on the edges of the carrier bandwidth may be defined to the resolution of RBG, partial RBG, RB, fractional RB, or subcarrier as defined previously.

In some embodiments, each guard zone is allocated as an integer multiple of a minimum scheduling resource unit, whatever that may be. Resource blocks and resource block groups are two specific examples.

Where a guard zone is allocated to a resolution that is the same as the scheduling resolution (be that RBG or RB), no separate signaling is necessary, because scheduling can be used to implement the guard zone. When a guard zone is allocated to a resolution that is other than the scheduling resolution, signaling can be employed to indicate the partial utilization.

In some embodiments, the scheduling is done to define guard zones that are a function of a transmitted waveform type. For example, in some embodiments, a transmitted waveform type is either filtered OFDM (f-OFDM) or windowed OFDM (W-OFDM). The guard zone requirement may be different for these two waveform types. In a specific example, first guard zones (either in RBG, fractional RBG, RB, fractional RB, or subcarriers) are allocated on edges of a band used to transmit f-OFDM, and second guard zones (either in RBG, RB, fractional RB, or subcarriers) are allocated on edges of a band used to transmit W-OFDM.

In some embodiments, the sizes of the guard zones are based on transmitter frequency localization capabilities. A transmitter with a better frequency localization capability will have better spectrum confinement than a transmitter with a poorer frequency localization capability. A relatively smaller guard zone can be implemented for a transmitter with better frequency localization compared to a transmitter with poorer frequency localization. Filtering and windowing are two examples of frequency localization features.

In some embodiments, a carrier can be divided into two or more sub-bands, or can be considered itself as a single sub-band. Each sub-band may use a same or different numerology. As an example, a single carrier is used to transmit signals with multiple different sub-carrier spacings in respective sub-bands. In some such embodiments, no guard band is defined between the sub-bands. Rather, a channelization framework is defined that includes the entire sub-bands. For example, one sub-band of a carrier may be used for 15 kHz sub-carrier spacing, and another sub-band of the same carrier may be used for 30 kHz sub-carrier spacing. Scheduling is used to define guard bands between the sub-bands.

In some embodiments, a carrier bandwidth will have a specified maximum supported channelization bandwidth. In a particular embodiment, this is 400 MHz. As a result, the bandwidth of any one sub-band will be equal or less than the maximum. In other embodiments, at least for single numerology usage within a carrier bandwidth, there is a specified maximum number of subcarriers supported in the carrier. In a particular embodiment, this maximum might be 3300 or 6600. For mixed numerology cases used in a carrier, at least the numerology with the lowest subcarrier spacing will have its total number of subcarriers in the carrier (bandwidth) equal or less than the specified maximum.

Table 1 is an example table to provide the maximum bandwidths for a given sub-carrier spacing to support a specified maximum number of sub-carriers in a carrier bandwidth; for example, 15 kHz sub-carrier spacing in a carrier or sub-band can support a maximum bandwidth of 50 MHz or 100 MHz, depending on the maximum number of sub-carriers in a carrier bandwidth. The minimum FFT size to support transmission on a given carrier needs to be greater than the number of sub-carriers supported. As a result, to support the maximum number of sub-carriers in a carrier bandwidth, the minimum FFT size in the carrier will be greater than 3300 or 6600. Note for the table two options are shown for each sub-carrier spacing and specified maximum number of subcarriers per carrier, and these are referred to as Option 1 and Option 2 in the table. Option 1 and Option 2 are based on different guard band factors. Specifically, Option 1 is based on a negligible guard band, and Option 2 is based on a 10% guard band like LTE; other options include different guard bands from Options 1 and 2 or even no guard bands. The bandwidth beyond 400 MHz is not listed, because for this example the maximum channel bandwidth supported per carrier is 400 MHz, and '-' in the table means this combination is not supported. A similar table can be generated for other maximum numbers of sub-carriers, and other guard bands.

occupies a bandwidth of 15 MHz with a numerology with sub-carrier spacing of 15 kHz, the sub-band will have 1000 sub-carriers to form 83 RBs (each with 12 sub-carriers) with the 4 remaining sub-carriers as a partial RB.

In an embodiment, the sub-carriers in a sub-band are organized to form RBs in a way such that the remaining sub-carriers (sub-carriers left over after defining as many full resource blocks as possible in the sub-band) are divided to two groups that are put at the two edges of the sub-band. This results in two partial RBs. This may be done, for example, by designating out one or more sub-carriers from the left-side edge of the sub-band as a first partial RB, to the right of the first partial RB forming as many full RBs as possible to the right-side edge of the sub-band, and designating remaining sub-carriers at the right-side edge as a second partial RB. For example, the remaining sub-carriers in a sub-band can be divided to be equal or roughly equal into two groups that are put at the two end edges of the sub-band. In another embodiment, the remaining sub-carriers in a sub-band are put at either end edge of the sub-band. The RBs, including the full RBs and partial RBs, can be configured by the resource scheduler. In other embodiments, a RB is used as a minimum scheduling resolution, and the orientations of the remaining sub-carriers or partial RB can be configured by using additional (on top of RB based scheduling) signaling(s), such as high-layer signaling, broadcast signaling, multi-cast signaling, slowing signaling or semi-static signaling, etc.

In some embodiments, a carrier bandwidth employs a single numerology and includes multiple sub-bands. The number of sub-carriers used in a sub-band is determined by

TABLE 1

Maximum bandwidths for a given sub-carrier spacing to support a specified maximum number of sub-carriers in a carrier bandwidth

| Maximum # of subcarriers per carrier | SCS (kHz) | | | | | | | |
|---|---|---|---|---|---|---|---|---|
| | 15 | | 30 | | 60 | | 120 | |
| | b/w (MHz) Option 1 | b/w (MHz) Option 2 | b/w (MHz) Option 1 | b/w (MHz) Option 2 | b/w (MHz) Option 1 | b/w (MHz) Option 2 | b/w (MHz) Option 1 | b/w (MHz) Option 2 |
| 3300 | 50 | 55 | 100 | 110 | 200 | 220 | 400 | — |
| 6600 | 100 | 110 | 200 | 220 | 400 | — | — | — |

In some embodiments, a carrier bandwidth employing a single numerology occupies a total of N sub-carriers. The N sub-carriers are equally spaced and sequentially ordered (e.g., 0, 1, . . . , N−1) over the carrier bandwidth. The carrier band can be divided into multiple sub-bands; depending on the bandwidth of a sub-band, the sub-band occupies an integer number of the sub-carriers from the N sub-carriers to form its channelization bandwidth, and different sub-bands can occupy different sub-carriers from the N sub-carriers. In some such embodiments, a fixed or configurable number (e.g., 12) of sub-carriers in a sub-band form one resource block (RB); two or more, RBs in the sub-bands form one RB group (RBG), the size of which may be fixed or configurable. Either one RB or one RBG can be used as the scheduling resolution. The sub-carriers in a sub-band may not be integer divisible by the size of the RB (e.g. 12 sub-carriers). In some embodiments, the left-over or remaining sub-carriers in each sub-band are used to define a partial RB; a partial RB can also be defined if one single sub-band uses the entire carrier bandwidth. For example, if a sub-band its bandwidth and the sub-carrier spacing value of the numerology; for example, a sub-band with 15 MHz bandwidth using 15 kHz sub-carrier spacing will have 1000 sub-carriers.

Figure 3D:
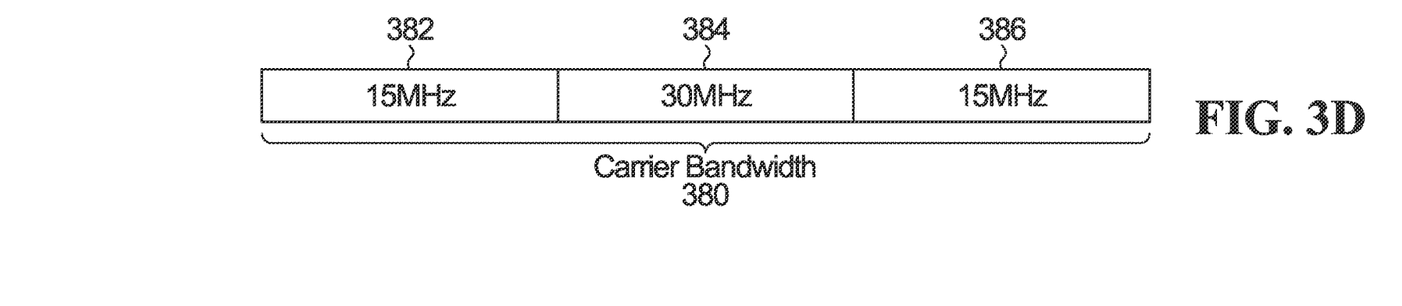
FIG. 3D is an example of bandwidth utilization where a carrier bandwidth is divided into sub-bands.
Figure 3E:
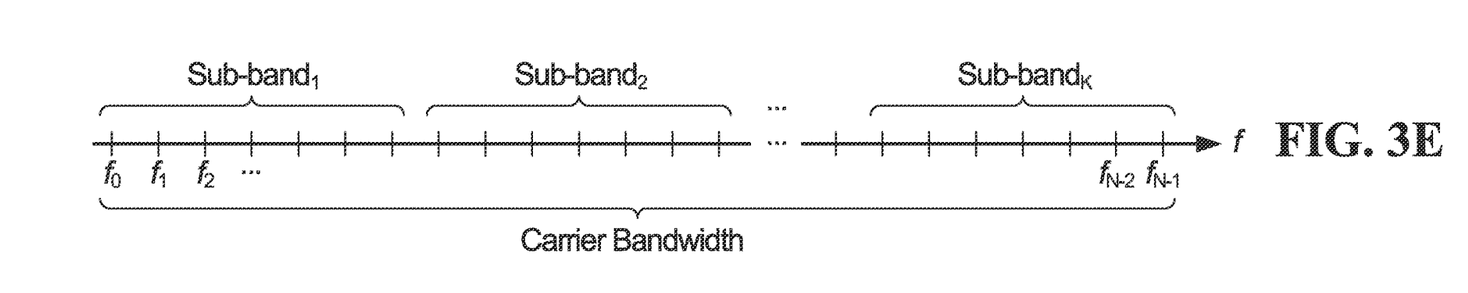
FIG. 3E is an example of continuous sub-carrier indexing within a carrier bandwidth across multiple sub-bands having a single sub-carrier spacing.
Figure 3F:
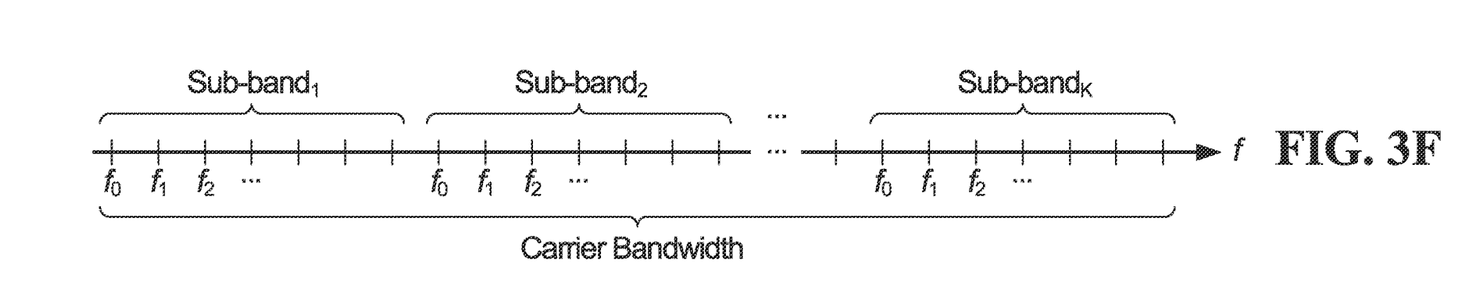
FIG. 3F is an example of sub-carrier indexing that re-starts in each sub-band within a carrier bandwidth for multiple sub-bands having a single sub-carrier spacing.

A sub-band can have its own sub-carrier orientation in terms of individual sub-carrier physical frequency location and index ordering of the sub-carriers. In some such embodiments, individual sub-carrier frequency locations are associated with the sub-carrier orientations of neighbor sub-bands; for example, all the sub-carrier frequency locations among different sub-bands align with a same (and global) sub-carrier grid across the carrier bandwidth, and the indexing on sub-carriers is globally done within the carrier bandwidth. An example of this is shown in FIG. 3E where the sub-carriers for K sub-bands are indexed continuously from 0 to N−1, where N is the total number of sub-carriers for the entire carrier. In another embodiment, the sub-carriers are re-numbered for each individual sub-band as shown in FIG. 3F. The approach with individually indexed sub-carriers in a sub-band can be employed to data transmission for a UE not capable of supporting the carrier bandwidth, together with a scheduling scheme that includes a two-step information to configure or allocate sub-carriers for the data transmissions. For example, resource allocation can be derived based on a two-step frequency-domain assignment process: 1st step: indication of a bandwidth part, e.g., indication of one or more sub-bands; 2nd step: indication of the RBs within the bandwidth part. As in the example described above, the RBs do not necessarily need to be uniform in size. Partial RBs may be preconfigured by signaling.

In general, absent frequency localization features, such as f-OFDM or W-OFDM, a guard band is required between any two adjacent sub-bands, and between two neighboring carrier bands. For a given UE, the UE may or may not support frequency localization features.

In some embodiments, a UE is configured to communicate its frequency localization capability to the network, for example to a transmission and reception point (TRP). This might, for example, occur during initial system access. This enables the network to determine the UE capability, and based in part on that, to determine if a guard band is required or not, and the size of the guard band if required.

In some embodiments, for a UE with an f-OFDM capability that is configured to transmit in a band using the f-OFDM capability, no guard band is required at all between the band and an adjacent band because the spectrum of the transmitted f-OFDM signal is well confined.

In some embodiments, for a UE with W-OFDM capability that is configured to transmit in a band using the W-OFDM capability, some guard band is required between the band and an adjacent band, because the W-OFDM signal is less well confined than an f-OFDM signal, so that the transmitted W-OFDM signal does not interfere with transmissions in an adjacent band.

For a UE that either has neither capability (or more generally has no frequency localization functionality), and for a UE that has some frequency localization capability but is not configured to use it, a guard band will be required, typically larger than that required for W-OFDM.

In some embodiments, the size of a guard band can be indicated in a scheduling message. In some embodiments, multiple sub-bands occupy a carrier bandwidth with mixed numerologies. An example is depicted in FIG. 3D. Shown is a 60 MHz carrier bandwidth 380 divided into a 15 MHz first sub-band 382 using 15 kHz sub-carrier spacing, a 30 MHz second sub-band 384 using a 30 kHz sub-carrier spacing, and a 15 MHz third sub-band 386 using a 15 kHz sub-carrier spacing. There is no pre-defined guard band defined between sub-bands 382 and 384, and no pre-defined guard band defined between sub-bands 384 and 386. Rather, any necessary channel separation is achieved through scheduling, for example as described above.

Figure 3G:
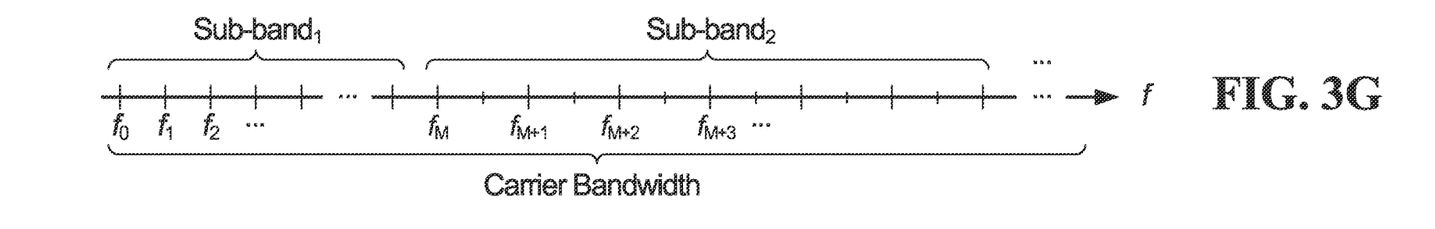
FIG. 3G is an example of continuous sub-carrier indexing within a carrier bandwidth across multiple sub-bands having different sub-carrier spacings.

In other embodiments, multiple sub-bands occupy a carrier bandwidth with mixed numerologies; a sub-band with a numerology will have a number of sub-carriers that are determined by its sub-band bandwidth and the sub-carrier spacing value of the numerology, for example, a sub-band with 30 MHz bandwidth using 30 kHz sub-carrier spacing will have 1000 sub-carriers. A sub-band may have a different numerology from its neighbor sub-band(s), and thus can have its own sub-carrier orientation, or individual sub-carrier physical location and index ordering. In some such embodiments, sub-carrier locations using the lowest sub-carrier spacing in the multiple sub-bands are used as a reference sub-carrier grid to align the sub-carriers and the sub-carrier indexing among all sub-bands in a carrier bandwidth with multiple scalable numerologies, where a sub-carriers in a larger sub-carrier spacing numerology take positions in the reference grid to make the sub-carrier orientations for all sub-bands more convenient and thus system signaling configuration more effective. An example is shown in FIG. 3G where the sub-carriers in two sub-bands have different spacings, but all are located on the grid with the smaller sub-carrier spacing. Sub-carrier indexing is continuous across the entire carrier bandwidth.

Figure 3H:
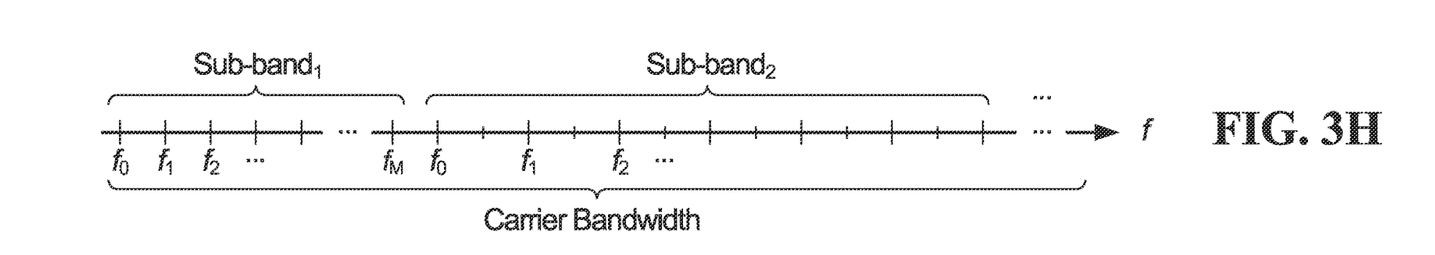
FIG. 3H is an example of sub-carrier indexing that re-starts in each sub-band within a carrier resource bandwidth for multiple sub-bands having a different sub-carrier spacings.

In other embodiments, multiple sub-bands occupy a carrier bandwidth with mixed numerologies, where the sub-carrier indexing in a different sub-band is renumbered or numbered relative to its associated sub-band. An example is shown in FIG. 3H which shows the same sub-carriers as the FIG. 3G example, but in which sub-carrier indexing is separate for each sub-band. This approach may be suitable for data transmission for a UE not capable of supporting the carrier bandwidth. In some embodiments, the two-step scheduling approach described above can be employed.

Figure 3I:
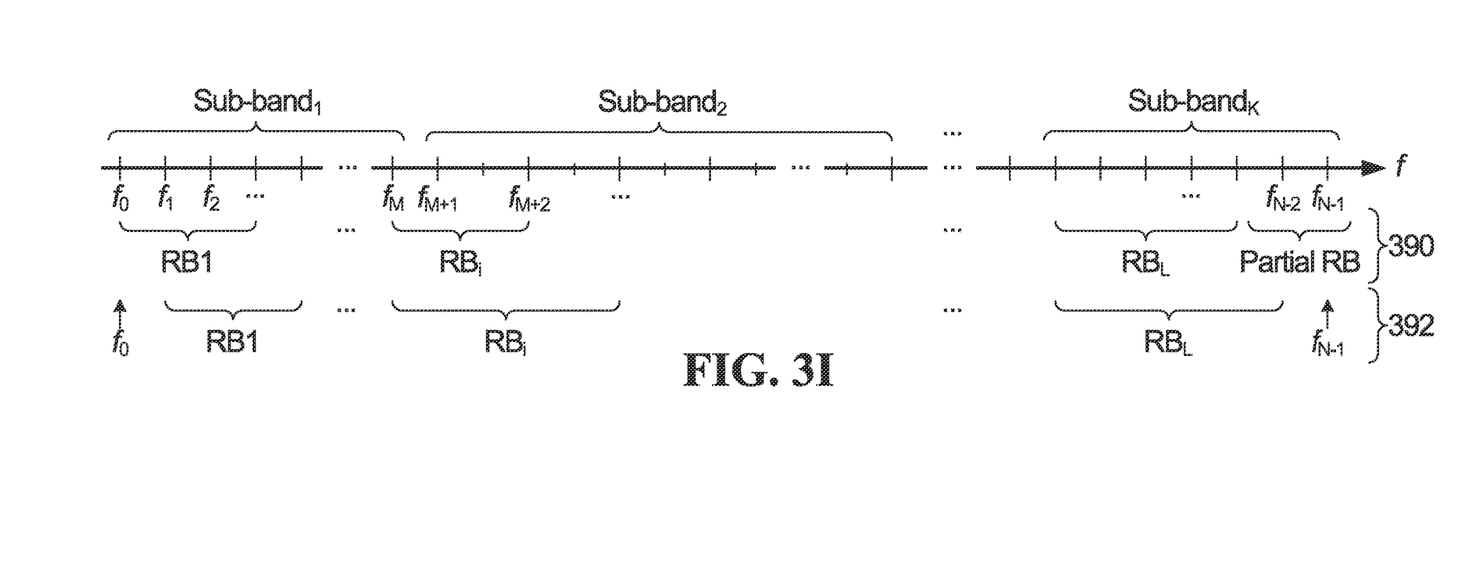
FIG. 3I shows a resource block definition scheme in which resource blocks are defined across an entire carrier bandwidth.

In some embodiments, multiple sub-bands occupy a carrier bandwidth with a minimum scheduling resolution of one RB, for a given RB size (e.g., 12). The RBs are formed sequentially from the sub-carriers over all sub-bands in a carrier bandwidth, leaving the remaining sub-carriers in only one partial RB. An example is shown in FIG. 3I where the sub-carriers of a set of sub-bands are used to form L RBs, and one partial RB. Note that the sub-bands occupying the carrier bandwidth can either all have the same numerology or have mixed numerologies. In this embodiment, the RB resources can be used most efficiently in the resource allocation scheduling, because only one partial RB remains after assigning the entire carrier bandwidth.

Depending on how many sub-bands there are, and depending also on the bandwidth division, in some embodiments, one RB may cross over an edge of one sub-band into a neighbouring sub-band. Such an RB includes respective parts that belong to each of the neighbouring sub-bands. FIG. 3I contains two examples of this. In the first example, generally indicated at 390, RB formulation occurs sequentially across the entire carrier bandwidth with one partial RB left on the right side. In the second example, generally indicated at 392, there is a partial RB split into between two ends of the carrier bandwidth that includes sub-carriers $f_0$ and $f_{N-1}$. Alternatively, for the second example, two partial RBs can be defined, one at each end. In both examples 390, 392, $RB_i$ is an RB that crosses the boundary between neighbouring sub-bands. In some embodiments, additional signaling is used to indicate the sub-band in which the RB is being scheduled. Alternatively, a two two-step frequency-domain assignment process can be employed, as described above. This RB organization scheme is able to provide an efficient resource utilization for a UE with an f-OFDM capability that is configured to transmit within a sub-band using the f-OFDM capability. No guard band is required between the sub-band and an adjacent sub-band because the spectrum of the transmitted f-OFDM signal is well confined. In such an embodiment, guard bands may still be defined at the edge of the carrier bandwidth through scheduling, as described previously.

Embodiments described herein provide for the definition of guard bands through scheduling at various resolutions, including individual sub-carriers and individual resource blocks. In some embodiments, where the guard band is defined to a resolution of one sub-carrier, this scheduling can be based on one of the sub-carrier indexing schemes described above. Where the guard band is defined to the resolution of one resource block or a partial resource block, this scheduling can be based on one of the resource block schemes described above. Optionally, this is combined with signaling to configure the sub-carrier indexing scheme and/or resource block definitions.

Figure 4A:
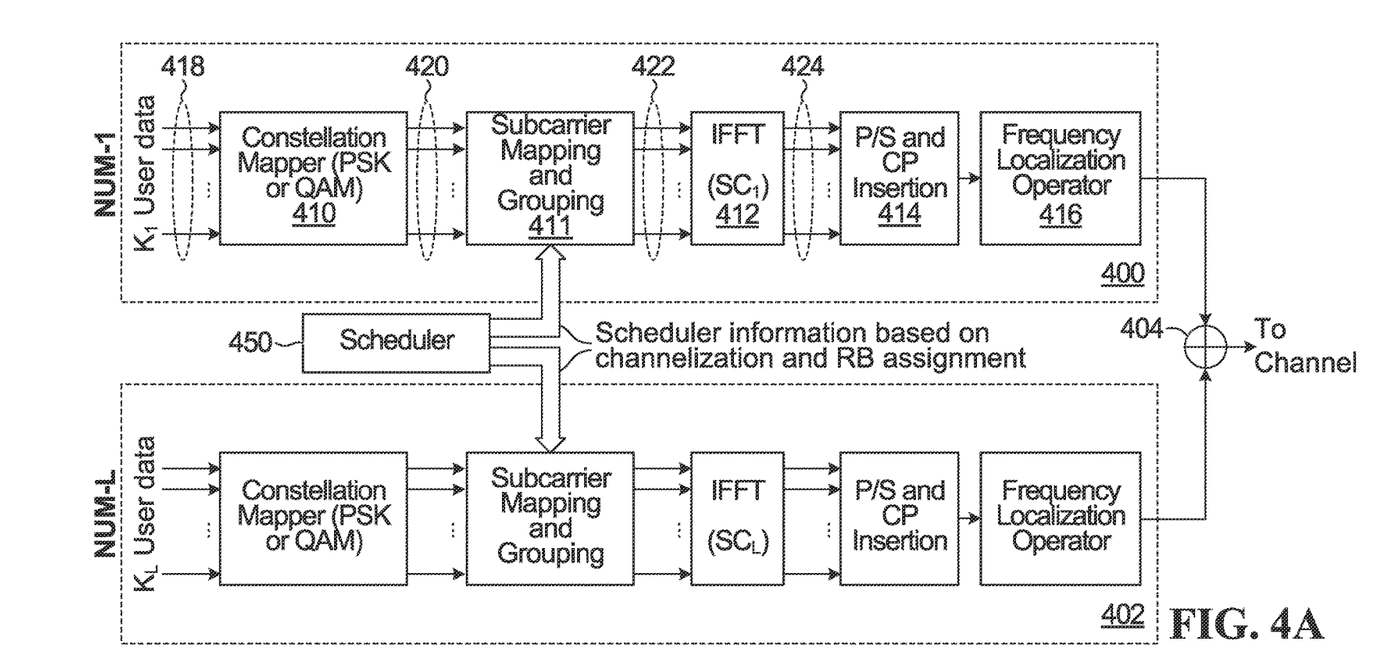
FIG. 4A is a block diagram of a transmitter.

Referring now to FIG. 4A, shown is an example simplified block diagram of part of a transmitter that can be used to perform scheduling as described above. In this example, there are L supported numerologies, where L>=2, each numerology operating over a respective sub-band with a respective sub-carrier spacing. However, this approach can be applied when there is only a single numerology.

Figure 4B:
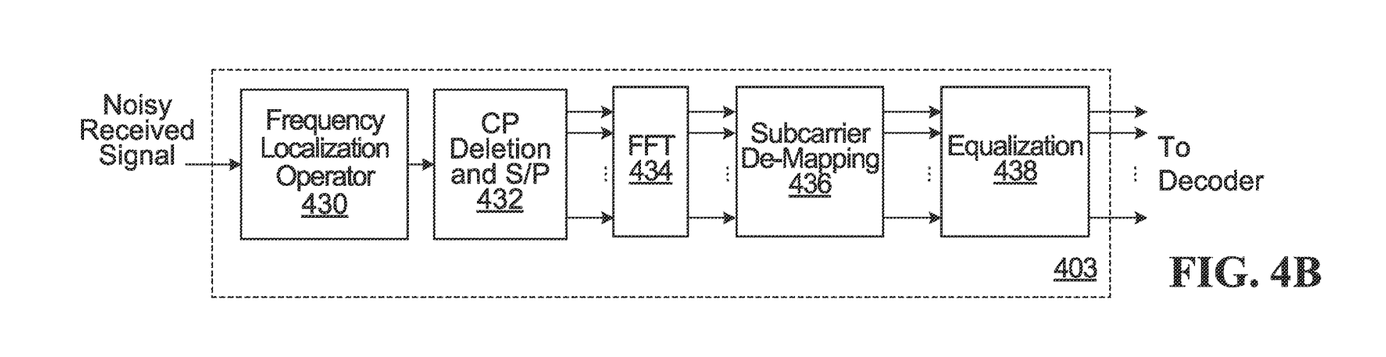
FIG. 4B is a block diagram of a receiver.

For each numerology, there is a respective transmit chain 400,402. FIG. 4A shows simplified functionality for the first and Lth numerology; the functionality for other numerologies would be similar. Also shown in FIG. 4B is simplified functionality for a receive chain 403 for a receiver operating using the first numerology.

The transmit chain 400 for the first numerology includes a constellation mapper 410, subcarrier mapping and grouping block 411, IFFT 412 with subcarrier spacing $SC_1$, pilot symbol and cyclic prefix insertion 414, and frequency localization operator 416 (for example filtering, sub-band filtering, windowing, sub-band windowing). Also shown is a scheduler 450 that performs scheduling using one of the methods described herein, for example the method of FIG. 5 described below, based on a channelization that occupies the entire sub-band bandwidths, with scheduling used to implement any required guard zones. It is noted that depending on the frequency localization operator implementation, different guard zones may be needed at the two edges of the spectrum and/or between sub-bands with different numerologies (i.e. different sub-carrier spacings). In some embodiments, the guard zones are determined taking into account frequency localization capabilities of both the transmitter and receiver.

In operation, constellation mapper 410 receives UE data (more generally, UE content containing data and/or signalling) for $K_1$ UEs, where $K_1>=1$. The constellation mapper 410 maps the UE data for each of the $K_1$ UEs to a respective stream of constellation symbols and outputs this at 420. The number of UE bits per symbol depends on the particular constellation employed by the constellation mapper 410. In the example of quadrature amplitude modulation (QAM), 2 bits from for each UE are mapped to a respective QAM symbol.

For each OFDM symbol period, the subcarrier mapping and grouping block 411 groups and maps the constellation symbols produced by the constellation mapper 410 to up to P inputs of the IFFT 412 at 422. The grouping and mapping is performed based on scheduler information, which in turn is based on channelization and resource block assignment, in accordance with a defined resource block definition and allocation for the content of the $K_1$ UEs being processed in transmit chain 400. P is the size of the IFFT 412. Not all of the P inputs are necessarily used for each OFDM symbol period. The IFFT 412 receives up to P symbols, and outputs P time domain samples at 424. Following this, in some implementations, time domain pilot symbols are inserted and a cyclic prefix is added in block 414. The frequency localization operator 416 may, for example, apply a filter $f_1(n)$ which limits the spectrum at the output of the transmit chain 400 to prevent interference with the outputs of other transmit chains such as transmit chain 402. The frequency localization operator 416 also performs shifting of each sub-band to its assigned frequency location.

The functionality of the other transmit chains, such as transmit chain 402 is similar. The outputs of all of the transmit chains are combined in a combiner 404 before transmission on the channel.

FIG. 4B shows a simplified block diagram of a receive chain for a user equipment operating with the first numerology depicted at 403. In some embodiments, a given user equipment is permanently configured to operate with a particular numerology. In some embodiments, a given user equipment operates with a configurable numerology. In either case, flexible resource block definitions are supported by the user equipment. The receive chain 403 includes frequency localization operator 430, cyclic prefix deletion and pilot symbol processing 432, fast Fourier transform (FFT) 434, subcarrier de-mapping 436 and equalizer 438. Each element in the receive chain performs corresponding reverse operations to those performed in the transmit chain. The receive chain for a user equipment operating with another numerology would be similar.

The subcarrier mapping and grouping block 411 of FIG. 4A groups and maps the constellation symbols based on the resource block definition(s) and scheduling. The scheduler 450 of FIG. 4A decides where in time and frequency the UE's resource blocks will be transmitted.

Figure 5:
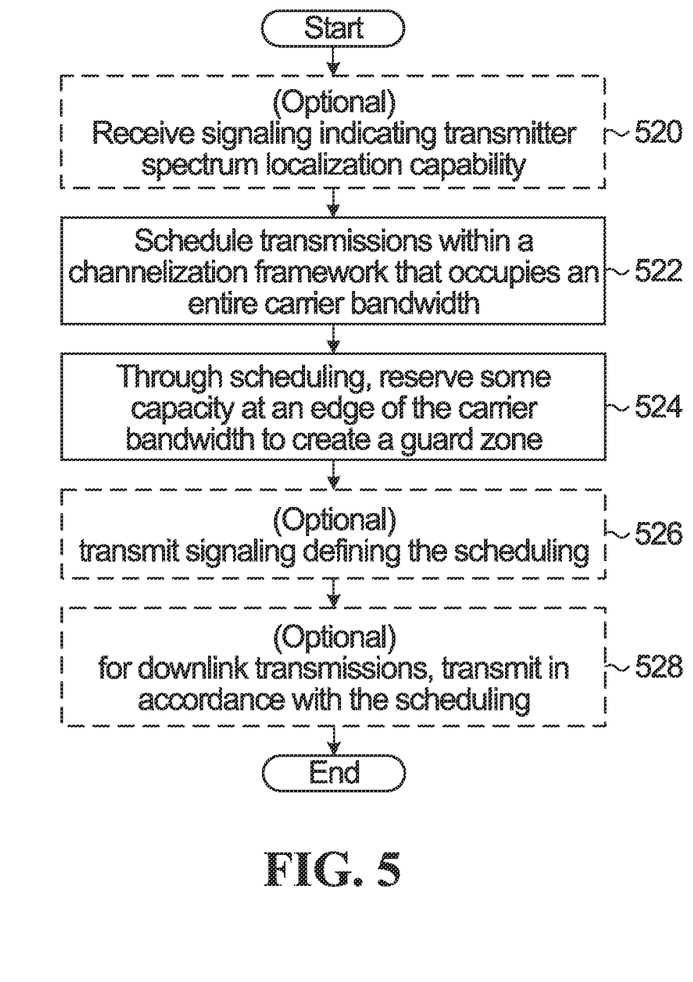
FIG. 5 is a flowchart of a method of bandwidth utilization provided by an embodiment of the invention.

FIG. 5 is a flowchart of a method provided by an embodiment of the invention. Optionally, the method begins in block 520 with the step of receiving signaling indicating transmitter frequency localization capability. In block 522, transmissions are scheduled within a channelization framework that occupies an entire carrier bandwidth. In block 524, through the scheduling, some capacity is reserved at an edge of the carrier bandwidth to create a guard zone. Optionally, in block 526, signalling is transmitted that defines the scheduling. This can indicate to a UE where downlink transmissions will occur, or can indicate to a UE where to make uplink transmissions. Optionally, in block 528, downlink transmissions are made in accordance with the scheduling. The same approach can be employed to define a guard band between adjacent sub-bands of a carrier, as detailed above. In this case, there is a respective channelization framework for each sub-band that occupies the entire sub-band, and scheduling is used to reserve capacity at an edge of a sub-band to create a guard zone between adjacent sub-bands.

Throughout this description, there are references to reserving capacity at an edge of a carrier bandwidth to create a guardband. More generally, no transmissions are scheduled in at least one sub-carrier at an edge of a carrier bandwidth. This may be done in response to a determination that a guard zone is needed.

Thus, in an overall approach, there can be a carrier bandwidth that is divided into multiple adjacent sub-bands. A respective channelization framework is defined within each sub-band. Two of the sub-bands will share an edge with the carrier bandwidth. Scheduling is used to define guard zones at the edge of the carrier bandwidth. In addition or alternatively, scheduling is used to define guard zones at the edges of adjacent sub-bands. For a given pair of adjacent sub-bands, there is a pair of adjacent sub-band edges. Depending on a given situation, the guard zone between adjacent sub-bands can include a guard zone at one or the other of the two sub-band edges, or at both sub-band edges.

Figure 6:
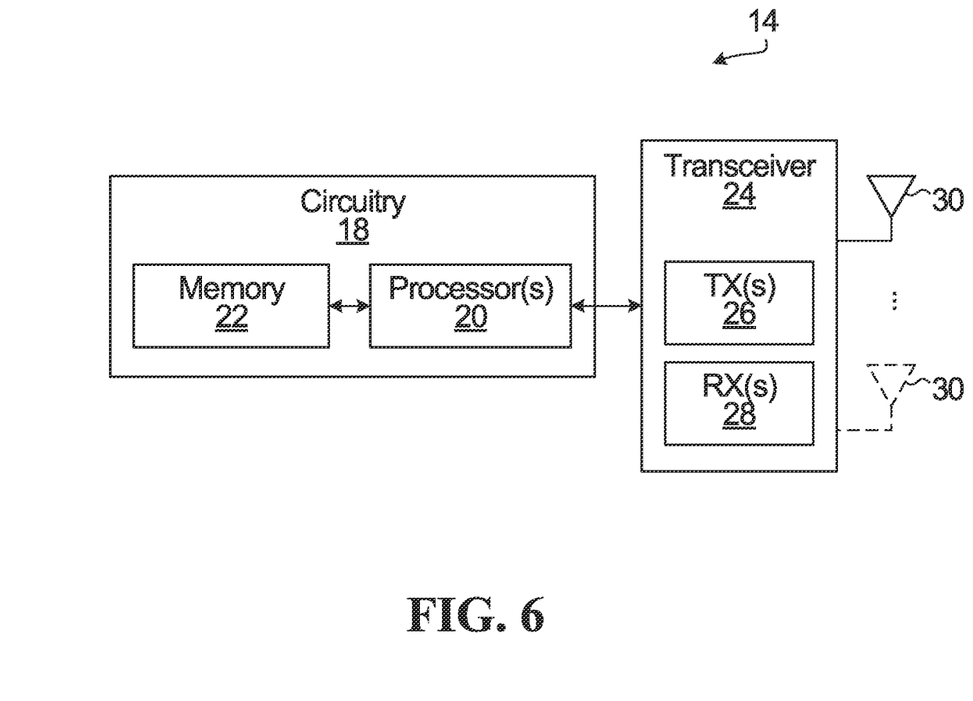
FIG. 6 is a block diagram of a base station.

FIG. 6 is a schematic block diagram of a BS 12 according to some embodiments of the present disclosure. As illustrated, the BS 12 includes a control system 34 configured to perform the network side functions described herein. In some implementations, the control system 34 is in the form of circuitry configured to perform the network side functions. In yet other implementations, the control system or circuitry 34 includes one or more processors 36 (e.g., CPUs, ASICs, FPGAs, and/or the like) and memory 38 and possibly a network interface 40. The BS 12 also includes one or more radio units 42 that each includes one or more transmitters 44 and one or more receivers 46 coupled to one or more antennas 48. In some other implementations, the functionality of the BS 12 described herein may be fully or partially implemented in software or modules that is, e.g., stored in the memory 38 and executed by the processor(s) 36.

In yet other implementations, a computer program including instructions which, when executed by at least one processor, causes the at least one processor to carry out the functionality of the BS 12 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 7:
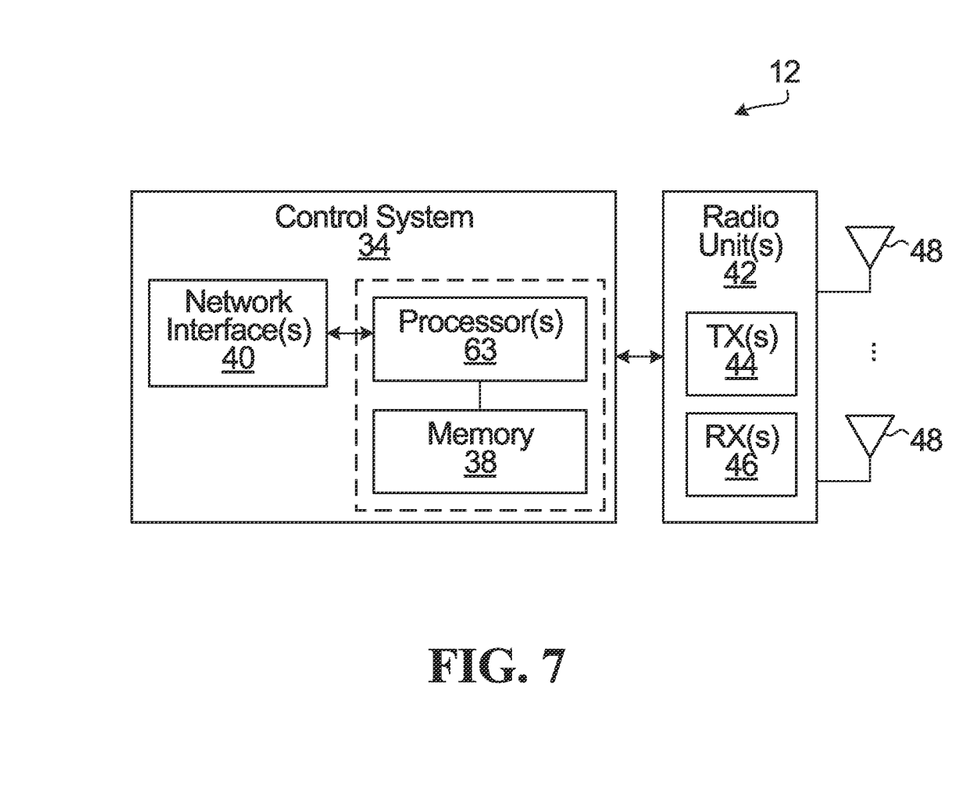
FIG. 7 is a block diagram of a wireless device.

FIG. 7 is a schematic block diagram of the wireless device 14 according to some embodiments of the present disclosure. As illustrated, the wireless device 14 includes circuitry 18 configured to perform the wireless device functions described herein. In some implementations, the circuitry 18 includes one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some other implementations, the functionality of the wireless device 14 described herein may be fully or partially implemented in software or modules that is, e.g., stored in the memory 22 and executed by the processor(s) 20.

In yet other implementations, a computer program including instructions which, when executed by at least one processor, causes the at least one processor to carry out the functionality of the wireless device 14 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method comprising:
communicating, by an apparatus with a transmission and reception point(TRP), a first signal in a first sub-band of a carrier, wherein the first sub-band has a first subcarrier spacing; the carrier comprises a second sub-band, the second sub-band has a second subcarrier spacing different from the first subcarrier spacing; and the carrier having a first guard band at a first edge of the carrier and a second guard band at a second edge of the carrier, wherein there is no guard band defined between the first sub-band and the second sub-band;
wherein the first guard band at the first edge of the carrier is adjacent to the first sub-band, and the second guard band at the second edge of the carrier is adjacent to the second sub-band, and wherein a first width in frequency of the first guard band is defined by the first subcarrier spacing, a second width in frequency of the second guard band is defined by the second subcarrier spacing, and the second guard band has a different width in frequency than the first guard band.

2. The method of claim 1, wherein a first scheduling is used for indicating the first width in frequency of the first guard band and a second scheduling is used to define the second width in frequency of the second guard band.

3. The method of claim 2, wherein each of the first scheduling and the second scheduling indicates resource information defined by resource unit of any one of resource block, partial resource block, resource block group or sub-carrier spacing.

4. The method of claim 1, the method further comprising:
receiving, by the apparatus, indication of at least one sub-band comprising the first sub-band.

5. The method of claim 1, the method further comprising:
receiving, by the apparatus, indication of resource information within the first sub-band, wherein the resource information is scheduled by resource unit of any one of the following:
resource block group;
fractional resource block group;
resource block;
fractional resource block;
sub-carrier.

6. The method of claim 1, wherein each of the first subcarrier spacing and the second subcarrier spacing is 15 kHz, 30 kHz, 60 kHz, or 120 kHz.

7. The method of claim 1, wherein the first subcarrier spacing has a reference sub-carrier grid to align with a sub-carrier of the second subcarrier spacing.

8. The method of claim 1, further comprising:
receiving, by the apparatus from the TRP, a second signal in the second sub-band of the carrier using the second subcarrier spacing.

9. The method of claim 8, wherein the first signal is transmitted with a waveform type of filtered orthogonal frequency division multiplexing (OFDM) or windowed OFDM, and/or the second signal is transmitted with a waveform type of filtered OFDM or windowed OFDM.

10. An apparatus comprising:
at least one processor; and
a memory storing processor-executable instructions that, when executed, cause the apparatus to:
communicate, with a transmission and reception point (TRP), a first signal in a first sub-band of a carrier, wherein the first sub-band has a first subcarrier spacing; the carrier comprises a second sub-band, the second sub-band has a second subcarrier spacing different from the first subcarrier spacing the carrier having a first guard band at a first edge of the carrier and a second guard band at a second edge of the carrier, wherein there is no guard band defined between the first sub-band and the second sub-band;

wherein the first guard band at the first edge of the carrier is adjacent to the first sub-band, and the second guard band at the second edge of the carrier is adjacent to the second sub-band, and wherein a first width in frequency of the first guard band is defined by the first subcarrier spacing, a second width in frequency of the second guard band is defined by the second subcarrier spacing, and the second guard band has a different width in frequency than the first guard band.

11. The apparatus of claim 10, wherein a first scheduling is used for indicating the first width in frequency of the first guard band and a second scheduling is used to define the second width in frequency of the second guard band.

12. The apparatus of claim 11, wherein each of the first scheduling and the second scheduling indicates resource information defined by resource unit of any one of resource block, partial resource block, resource block group or sub-carrier spacing.

13. The apparatus of claim 10, wherein the first subcarrier spacing has a reference sub-carrier grid to align with a sub-carrier of the second subcarrier spacing.

14. A method comprising:
communicating, by transmission and reception point (TRP) with an apparatus a first signal in a first sub-band of a carrier, wherein the first sub-band has a first subcarrier spacing; the carrier comprises a second sub-band, the second sub-band has a second subcarrier spacing different from the first subcarrier spacing; and the carrier having a first guard band at a first edge of the carrier and a second guard band at a second edge of the carrier;

wherein the first guard band at the first edge of the carrier is adjacent to the first sub-band, and the second guard band at the second edge of the carrier is adjacent to the second sub-band, and wherein a first width in frequency of the first guard band is defined by the first subcarrier spacing, a second width in frequency of the second guard band is defined by the second subcarrier spacing, and the second guard band has a different width in frequency than the first guard band.

15. The method of claim 14, wherein a first scheduling is used for indicating the first width in frequency of the first guard band and a second scheduling is used to define the width in frequency of the second guard band.

16. The method of claim 15, wherein each of the first scheduling and the second scheduling indicates resource information defined by resource unit of any one of resource block, partial resource block, resource block group or sub-carrier spacing.

17. The method of claim 14, wherein the first subcarrier spacing has a reference sub-carrier grid to align with a sub-carrier of the second subcarrier spacing.

18. A transmission and reception point (TRP) comprising:
at least one processor; and
a memory storing processor-executable instructions that, when executed, cause the TRP to:
communicate with an apparatus, a first signal in a first sub-band of a carrier, wherein the first sub-band has a first subcarrier spacing; the carrier comprises a second sub-band, the second sub-band has a second subcarrier spacing different from the first subcarrier spacing; and the carrier having a first guard band at a first edge of the carrier and a second guard band at a second edge of the carrier, wherein there is no guard band defined between the first sub-band and the second sub-band;
wherein the first guard band at the first edge of the carrier is adjacent to the first sub-band, and the second guard band at the second edge of the carrier is adjacent to the second sub-band, and wherein a first width in frequency of the first guard band is defined by the first subcarrier spacing, a second width in frequency of the second guard band is defined by the second subcarrier spacing, and the second guard band has a different width in frequency than the first guard band.

19. The TRP of claim 18, wherein a first scheduling is used for indicating the first width in frequency of the first guard band and a second scheduling is used to define the width in frequency of the second guard band.

20. The TRP of claim 19, wherein each of the first scheduling and the second scheduling indicates resource information defined by resource unit of any one of resource block, partial resource block, resource block group or sub-carrier spacing.

21. The TRP of claim 18, wherein the first subcarrier spacing has a reference sub-carrier grid to align with a sub-carrier of the second subcarrier spacing.

22. The apparatus according to claim 10, wherein the instructions, when executed, further cause the apparatus to:
receive indication of at least one sub-band comprising the first sub-band.

23. The apparatus according to claim 10, wherein each of the first subcarrier spacing and the second subcarrier spacing is 15 kHz, 30 kHz, 60 kHz, or 120 kHz.

24. The apparatus according to claim 10, wherein the instructions, when executed, further cause the apparatus to:
receive from the TRP, a second signal in the second sub-band of the carrier using the second subcarrier spacing.

25. The TRP according to claim 18, wherein the instructions, when executed, further cause the TRP to:
transmit indication of at least one sub-band comprising the first sub-band.

* * * * *